United States Patent
Ehn et al.

(10) Patent No.: US 10,752,193 B2
(45) Date of Patent: Aug. 25, 2020

(54) VEHICLE INCORPORATING A DEFORMABLE FRONT FRAME STRUCTURE

(71) Applicant: Volvo car Corporation, Gothenburg (SE)

(72) Inventors: Joakim Ehn, Trollhättan (SE); Christer Berndtsson, Marstrand (SE)

(73) Assignee: Volvo Car Corporation, Gothenburg (SE)

( * ) Notice: Subject to any disclaimer, the term of this patent is extended or adjusted under 35 U.S.C. 154(b) by 178 days.

(21) Appl. No.: 16/018,231

(22) Filed: Jun. 26, 2018

(65) Prior Publication Data

US 2019/0054875 A1    Feb. 21, 2019

(30) Foreign Application Priority Data

Aug. 17, 2017   (EP) ..................................... 17186569

(51) Int. Cl.
*B60R 19/18* (2006.01)
*B60K 1/00* (2006.01)
(Continued)

(52) U.S. Cl.
CPC ................ *B60R 19/18* (2013.01); *B60K 1/00* (2013.01); *B62D 21/11* (2013.01); *B62D 21/152* (2013.01);
(Continued)

(58) Field of Classification Search
CPC ... B60R 19/18; B60R 21/34; B60R 2021/343; B60K 1/00; B60K 2001/001; B60K 1/04;
(Continued)

(56) References Cited

U.S. PATENT DOCUMENTS

| | | | | |
|---|---|---|---|---|
| 3,896,896 A | * | 7/1975 | Saitoh | B62D 21/152 280/784 |
| 5,605,353 A | * | 2/1997 | Moss | B62D 21/09 188/376 |

(Continued)

FOREIGN PATENT DOCUMENTS

| | | |
|---|---|---|
| DE | 102006002750 A1 | 9/2007 |
| EP | 1870317 A1 | 12/2007 |

(Continued)

OTHER PUBLICATIONS

Feb. 19, 2018 European Search Report issue on International Application No. EP17186569.4.

*Primary Examiner* — John D Walters
(74) *Attorney, Agent, or Firm* — Clements Bernard Walker; Christopher L. Bernard

(57) ABSTRACT

A vehicle, including: an electric motor operatively connected to at least one driving wheel of the vehicle, and a frame structure including first and second side members extending in a longitudinal direction along opposite sides of the vehicle and at least one cross member extending in a transversal direction of the vehicle and being connected to the first and second side members, wherein the electric motor is supported by the frame structure such that the electric motor is arranged in a front portion of the vehicle in association with a pair of front wheels of the vehicle, and wherein each of the side members, at least along a deformable section thereof, is configured to deform by bending in an inwards and/or outwards transversal direction when compressed by a longitudinally directed force exceeding a threshold value, such as in case the vehicle is subject to a sufficiently energetic frontal collision.

15 Claims, 3 Drawing Sheets

(51) Int. Cl.
*B62D 21/15* (2006.01)
*B62D 21/11* (2006.01)
*B62D 25/08* (2006.01)
*B60R 21/34* (2011.01)

(52) U.S. Cl.
CPC ...... *B62D 25/085* (2013.01); *B60K 2001/001* (2013.01); *B60R 2021/343* (2013.01)

(58) Field of Classification Search
CPC ...... B62D 21/11; B62D 21/15; B62D 21/152; B62D 25/08; B62D 25/085
USPC .......................................................... 180/60
See application file for complete search history.

(56) References Cited

U.S. PATENT DOCUMENTS

| | | | |
|---|---|---|---|
| 6,029,765 A | | 2/2000 | Chou et al. |
| 7,992,926 B2* | | 8/2011 | Tamakoshi ........... B62D 21/155 |
| | | | 296/187.09 |
| 9,061,713 B2* | | 6/2015 | Hashimoto ............. B60R 19/02 |

FOREIGN PATENT DOCUMENTS

| | | |
|---|---|---|
| FR | 3011204 A1 | 4/2015 |
| JP | 2012041009 A | 3/2012 |

\* cited by examiner

VEHICLE INCORPORATING A DEFORMABLE FRONT FRAME STRUCTURE

CROSS-REFERENCE TO RELATED APPLICATION

The present patent application/patent claims the benefit of priority of co-pending EP17186569.4, filed on Aug. 17, 2017, and entitled "VEHICLE," the contents of which are incorporated in full by reference herein.

TECHNICAL FIELD

This invention relates to a vehicle incorporating a deformable front frame structure. In particular, the invention relates to how to support an electric motor in the front frame structure of an electric vehicle.

BACKGROUND

Electric vehicles are about to form a widespread alternative to vehicles provided with internal combustion engines. The powertrain of an electric vehicle differs from that of a conventional vehicle mainly in that, instead of an internal combustion engine and a gearbox, the electric vehicle is equipped with one or more electric motors operatively connected to the driving wheels of the vehicle and, commonly, a battery pack for storage of electric energy.

This disclosure is concerned with electric motors supported by the vehicle frame structure, not with in-wheel motors incorporated into the hub of a driving wheel, for example.

The electric powertrain provides for a number of possibilities and challenges with regard to the design of the vehicle body frame structure for electric vehicles. An example of an issue is how to arrange an electric motor for driving of the front wheels of a passenger car, i.e., how to arrange the electric motor in a front portion of the car in what conventionally is referred to as the engine bay.

JP2012041009 discloses an arrangement for supporting an electric motor at the rear of a vehicle, wherein a motor supporting member is connected to left and right side frames and to a rear cross member. An arrangement of this type may work well for a rear portion of a vehicle, but in the front portion the situation is different, primarily because the frame structure in the front portion for safety reasons is designed very differently as compared to the rear portion. For instance, to absorb collision energy in case of a frontal collision, the side members are typically configured to deform by bending, buckling, etc. The arrangement of JP2012041009 is not adapted to deformation of side members or to handling of frontal collision energy.

Conventional arrangements for supporting an internal combustion engine in the engine bay are adapted to frontal crash situations, for instance by using engine mounts that break and detach the engine from the frame structure side members in the event of a crash. Electric motors, however, are generally much smaller than the conventional engines, so the same type of engine mounts cannot be used. Possibly, very large breakable engine/motor mounts could be developed and used, but this would lead to a complex and costly design.

There is a need for solutions regarding how to arrange the electric motor in an electric vehicle, in particular how to arrange the motor in a front portion of a passenger car.

BRIEF SUMMARY

The invention concerns a vehicle, including: an electric motor operatively connected to at least one driving wheel of the vehicle; a frame structure including first and second side members extending in a longitudinal direction along opposite sides of the vehicle and at least one cross member extending in a transversal direction of the vehicle and being connected to the first and second side members, wherein the electric motor is supported by the frame structure.

The invention is characterized in that the electric motor is arranged in a front portion of the vehicle in association with a pair of front wheels of the vehicle, wherein each of the side members, at least along a deformable section thereof, is configured to deform by bending in an inwards and/or outwards transversal direction when compressed by a longitudinally directed force exceeding a threshold value, such as in case the vehicle is subject to a sufficiently energetic frontal collision, wherein a first cross member extends between the first and second side members at the deformable section thereof, wherein the electric motor is supported by the first cross member, wherein the first cross member is mounted to at least one of the side members via a mounting arrangement including an elongated fastening element extending in a direction that exhibits a substantial angle in relation to the transversal direction of the vehicle, preferably around 90°, wherein the fastening element extends through a first hole in the cross member and a second hole in the corresponding side member, wherein at least one of the first and second holes, at least in the transversal direction, is substantially larger/wider than a diameter of the fastening element so as to allow at least an initial bending deformation of the side member without pressing the fastening element onto an edge of the larger/wider hole.

To allow this initial bending deformation, i.e., to allow a movement of the side member in relation to the cross member in the transversal direction, there is thus a space provided between the fastening element and the edge of the hole (if any, it may be an open slot) brought about by making the opening of at least one of the holes substantially larger/wider than the diameter of the fastening element.

In a conventional mounting arrangement of this type, i.e., where a bolt or similar fastening element extends through holes in two separate components that are to be mounted together, the holes and the bolt have roughly the same diameter (the holes are somewhat larger to admit axial insertion of the bolt). When the components are pulled apart or pushed together in the radial direction of the bolt and holes, the relative movement of the components is partly prevented by friction in the mounting arrangement (the level of which often can be adjusted by, e.g., adjusting the tightening of the bolt) but more firmly prevented by the bolt/fastening element pressing onto the edge of one or both the holes. The movement in the radial direction is thus prevented by the material of the components (and of the bolt).

If such a conventional mounting arrangement would be used for mounting the cross member to the side members, it would prevent the side members from deforming/bending properly in the transversal direction in the event of a frontal collision. The cross member would form a stiff connection between the side members and make the side members stiff.

By making at least one of the first and second holes substantially larger or wider than the diameter of the fastening element in the transversal direction, it is possible to let the bending deformation of the side member continue for some initial time/distance without pressing the fastening element onto any edge the larger hole. During this initial bending process, only the friction forces of the mounting arrangement need to be overcome for achieving a relative movement in the transversal direction between the cross member and the side member. The friction force can be suitably adjusted by selecting a proper tightening of the bolt/fastening element and/or by using appropriate bushings, washers, etc. The friction force should of course be sufficiently large to prevent movements during normal operation of the vehicle.

A main advantage of the inventive design is that during the initial bending deformation, the side member is allowed to achieve a considerable velocity and momentum (even if this initial phase may last for only a few milliseconds), which means that the further bending deformation and collision energy absorption is much easier to control. For instance, some part or parts of the cross member or the side member may be designed to collapse when exposed to the force resulting from the velocity and momentum of the already initiated bending movement of the side member.

If the side member would not be allowed to initiate its bending movement by overcoming only the friction forces so as to achieve the considerable velocity and momentum, as would be the case in a conventional mounting arrangement, it would become much more difficult to properly design collapsible parts that would allow for a proper bending deformation of the side member. It would require some sort of weakening of the material around the first or the second hole, which could jeopardize the strength of the whole structure.

Exactly which hole(s) that should be made larger, and whether the hole should extend on an outside or an inside or on both sides (transversally) of the fastening element, depends on the particular design of the frame structure, the side members, the cross member, etc. Further, the side members may be configured to bend in different directions at certain positions/bending lines. For instance, the side member may be intended to bend inwards at a first bending line, outwards at a second bending line, and perhaps inwards again at a third bending line. Such a side member may thus deform into a Z-shaped form or similar. Accordingly, whether the hole primarily should be made larger/wider on the inside or the outside of the fastening element depends also on the position of the fastening elements in relation to the intended bending lines of the side members; the hole may be adapted to admit outwards or inwards bending, or both.

As an example, the side member may be positioned on top of the cross member with a fastening element in the form of a bolt extending vertically and being inserted downwardly through a hole in the side member and be tightened by means of threads in a hole in the cross member. The hole to make larger in such a case is the hole in the side member (since the hole in the cross member is provided with threads that holds the fastening element in place). If the fastening element is placed at a bending line where the side member is configured to bend outwardly, i.e., in a direction away from the cross member (and thus away from a longitudinal centreline of the vehicle), the hole in the side member should be made larger/wider on (at least) the inside of the hole (towards the cross member/centreline). This allows the side member to initiate an outwardly directed bending deformation. The hole in the side member may form a slot that is open in an inwards direction, i.e. open towards the centreline of the vehicle, so as to allow the fastening element to come loose entirely from the side member without any particular or intended breakage of the mounting arrangement or other part.

If the fastening element in the example above instead is placed at a bending line where the side member is configured to bend inwardly, i.e., in a direction towards the cross member (and thus towards the longitudinal centreline of the vehicle), the hole in the side member should be made larger/wider on (at least) the outside of the hole.

In another example, the fastening element may instead be inserted upwardly and be tightened to threads in the side member on top of the cross member. The larger/wider hole would then be made in the cross member. On which side of the fastening element to enlarge/widening the hole depends on whether the side member at that location is intended to bend outwards or inwards.

Other examples include structures where the cross member is arranged on top of the side member at the mounting arrangement and where the fastening element is not tightened in any of the members but with an external nut. In the latter case both the first and the second hole may be enlarged/widened.

The exact minimum width of the enlarged/widened hole depends on the application, but is in any case much larger than a typical tolerance for admitting insertion of the fastening element through the hole. In many applications, the transversal width of the hole is at least two times the diameter of the fastening element.

The elongated fastening element is preferably arranged perpendicular to the transversal direction, i.e., in the vertical/longitudinal plane, to form a mounting arrangement with high strength. The fastening element may extend in a direction that deviates somewhat from the vertical/longitudinal plane.

The mounting arrangement at one of the side members may include first and second longitudinally spaced fastening elements and corresponding first and second sets of holes. The design of each of these mounting sub-arrangements may differ. For instance, one of the fastening elements may be positioned at a bending line configured for outward bending of the side member and the other may be positioned at a bending line configured for inward bending. The mounting arrangement may of course include further fastening elements and/or mounting components. A second or further longitudinal fastening element may be positioned at a distance from any bending line where the side member is not intended to bend.

The electric motor is preferably arranged on an underside of the first cross member. Besides the electric motor, the first cross member may support a transmission operatively connected to the electric motor.

In an embodiment of the invention, a resilient material is arranged between the first cross member and the first and second side members so as to eliminate or reduce transfer of vibrations. The electric motor and any transmission unit connected to the motor generate vibrations that are likely to produce noise in a passenger compartment of the vehicle. Arranging resilient material between the first cross member and the side members so as to prevent a direct contact between components is likely to eliminate or reduce the production of such noise.

In an embodiment of the invention, the elongated fastening element is provided with a screw head. The fastening element may thus be a regular bolt. Alternatively, it may be a rivet or similar.

In an embodiment of the invention, the mounting arrangement is provided with a bushing arrangement made of a resilient material, wherein the bushing arrangement includes first and second annular parts arranged circumferentially around the fastening element, wherein the first annular part is arranged between the screw head and any of the side member or the first cross member, and wherein the second annular part is arranged between the side member and the first cross member.

Further parts, such as a washer or an insert for distributing pressure or holding things in place, may be arranged between the screw head and the side member/first cross member (whichever component that is positioned closest to the screw head) and between the side member and the first cross member.

An advantage of arranging the first and second bushing parts this way is to prevent transfer of vibrations between the first cross member and the side members.

A further effect of this arrangement is that the edge of the hole of one of the side member or the first cross member can be clamped between the first and second bushing parts (which in turned are clamped between the screw head and one of the members). This can be used to lower the friction between the side member and the first cross section compared to the case where metal is clamped against metal, which could result in a too high friction for allowing the bending deformation to be initiated, i.e., a too high friction for moving the side member transversally in relation to the first cross member.

In an embodiment of the invention, the bushing arrangement includes a third annular part extending axially between and connecting the first and second annular parts, preferably the first, second and third annular parts form one integral annular unit. Such a bushing arrangement provides for improved vibration insulation and an integral, single unit is easy to handle during manufacturing.

In an embodiment of the invention, the first and second annular parts of the bushing arrangement protrudes outwardly in a radial direction of the fastening element so as to form a recess along and around the third annular part. Preferably, a side of an edge of the first or the second hole is adapted to fit into the recess along and partly around the third annular part of the bushing arrangement. If the hole is elongated, the fastening element and the bushing arrangement can be positioned at one end of the elongated hole with an edge of the hole fitted into the recess at on side of the bushing arrangement (the other side facing an empty space in the elongated hole).

In an embodiment of the invention, the elongated fastening element extends through the hole in the side member and is fixed into the hole of the first cross member. Preferably, the hole in the side member is substantially larger/wider in the transversal direction than the diameter of the fastening element. Preferably, the hole in the side member is larger/wider at an inside of the fastening member.

This is a preferred structure in certain applications and allows the side member to bend outwards.

In an embodiment of the invention, the larger/wider hole provides a space transversally inside and/or outside of the elongated fastening element, wherein said space is adapted to receive a part of the mounting arrangement when the side member is moved in relation to the cross member in the transversal direction. This is a result of enlarging/widening the hole as described above. The space formed does not necessarily have to be empty but may contain compressible material (i.e., foam or other easily compressible material that allows the fastening element to occupy the major part of the space; a resilient material suitable for absorbing vibrations and forming the bushing mentioned above is not "easily compressible").

In case an annular bushing or similar surrounds the elongated fastening element at the enlarged/widened hole and follows the fastening element when it moves along an oblong or otherwise widened hole, the width of the hole, i.e., the size of the space provided transversally inside and/or outside of the elongated fastening element, may need to be adapted (enlarged) to take into account the total diameter of the fastening element and the bushing.

In an embodiment of the invention, the vehicle includes a transmission unit operatively connected to the electric motor, wherein also the transmission unit is supported by the first cross member. This is an advantageous way of supporting such a transmission unit, partly because the cross member can be adapted to perform this task, partly because any vibrations from the transmission unit also can be eliminated or reduced.

In an embodiment of the invention, the electric motor is operatively connected to at least one of the front wheels, preferably to both front wheels.

In an embodiment of the invention, the vehicle is a passenger car including a passenger compartment, wherein the first cross member is located in front of the passenger compartment.

BRIEF DESCRIPTION OF THE DRAWINGS

In the description of the invention given below, reference is made to the following figures, in which.

DETAILED DESCRIPTION

The invention will now be described with reference to FIGS. 1-6. All figures are more or less schematic and intended to disclose the principle rather than the exact design that may differ depending on the application.

Figure 1:
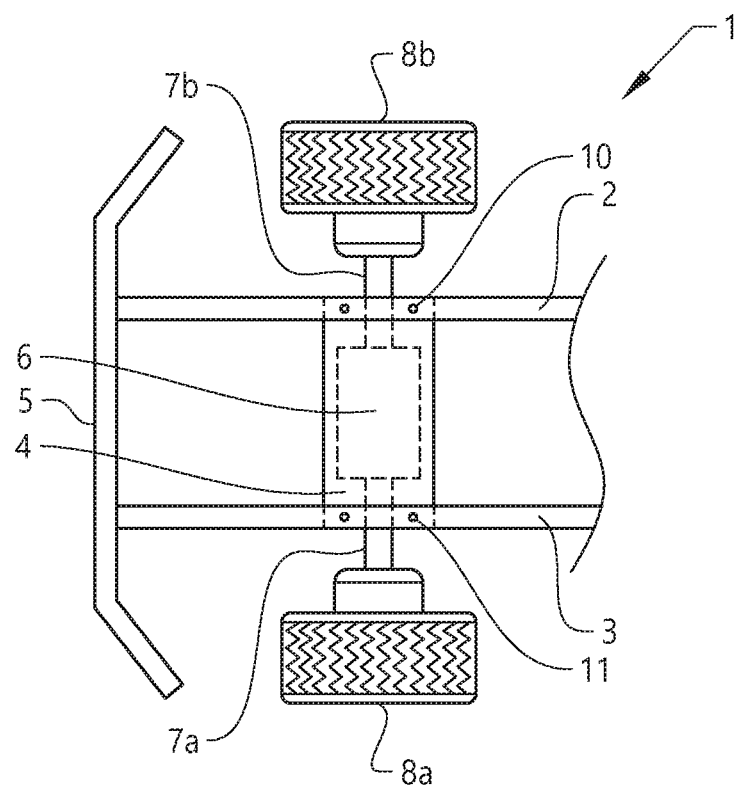
FIG. 1 shows, in a schematic view, some parts of a front portion of a vehicle, including connections between a cross member and side members, according to an embodiment of the invention.

FIG. 1 shows a top view of a front portion of a passenger vehicle 1. A passenger compartment (not shown) is located to the right. The figure is schematic and shows only a few parts of the front portion. The vehicle 1 is provided with a frame structure including first and second side members 2, 3 extending in a longitudinal direction along opposite sides of the vehicle 1. The frame structure further includes first and second cross members 4, 5 extending in a transversal direction of the vehicle 1 and being connected to the first and second side members 2, 3. The second cross member 5 is arranged at the very front of the frame structure and may be referred to as a bumper beam.

The vehicle 1 is provided with an electric motor 6 operatively connected via drive means 7a, 7b to front driving wheels 8a, 8b for propelling the vehicle 1. The electric motor 6 is supported by and arranged on an underside of the first cross member 4.

Each of the side members 2, 3 is provided with a particular deformable section that exhibits some extension in the longitudinal direction. Along this deformable section each side member 2, 3 is configured to deform by bending at pre-determined bending lines in an inwards or outwards transversal direction when compressed by a longitudinally directed force exceeding a threshold value, such as in case the vehicle 1 is subject to a sufficiently energetic frontal collision. At a specific bending line the side member 2, 3 is intended to bend outwards, at another bending line the side member 2, 3 is intended to bend inwards. The purpose of the deformable section is to absorb collision energy in the event of a (frontal) collision. Bending deformation structures are known as such.

Figure 3:
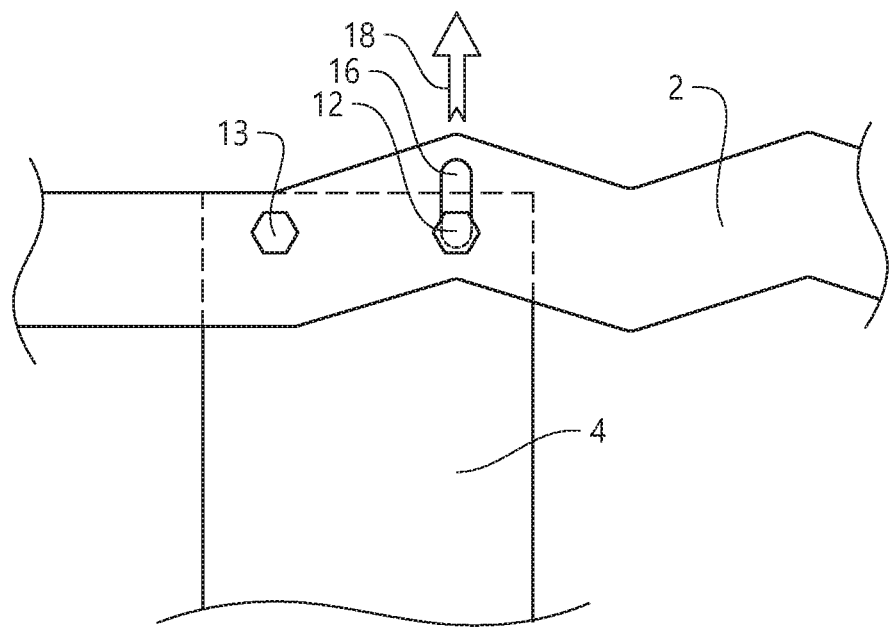
Figure 4:
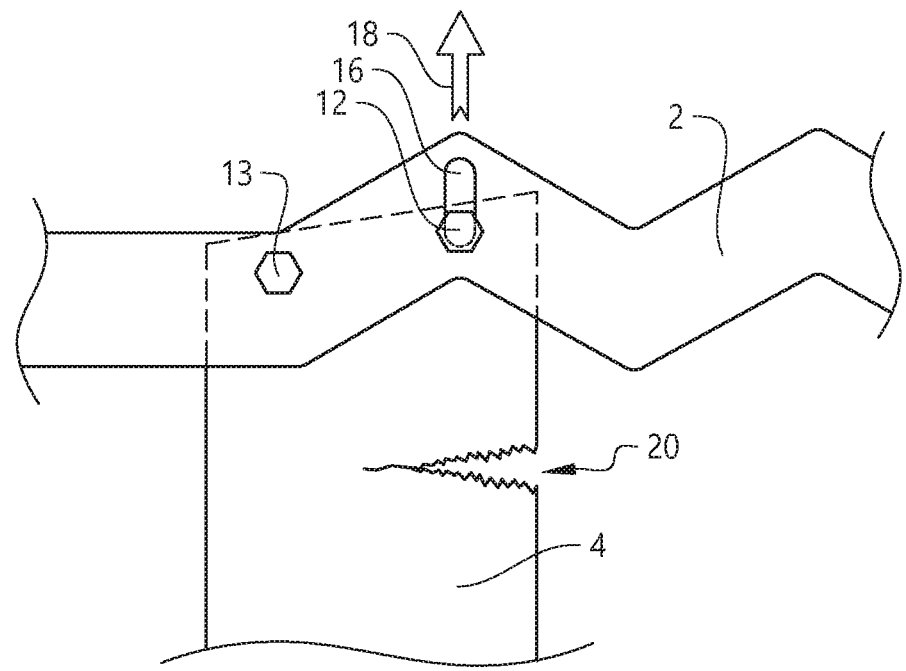

The deformable section is located in the same longitudinal zone of the vehicle as the front wheels 8*a*, 8*b*, etc. (and extends in this example somewhat rearwards as indicated in FIGS. 3-4). The first cross member 4 thus extends between and is connected to the first and second side members 2, 3 at the deformable section thereof.

The first cross member 4 is mounted to the first and second side members 2, 3 via first and second mounting arrangements 10, 11, respectively. Each mounting arrangement 10, 11 includes first and second elongated fastening elements in the form of bolts 12, 13 extending in a vertical direction and thus exhibiting an angle of around 90° in relation to the transversal direction of the vehicle 1. FIGS. 1-4 show only the screw heads of the bolts 12, 13.

The two mounting arrangements 10, 11 are in this example identical (but mirror-inverted). The first and second bolts 12, 13 form part of two separate mounting sub-arrangements, which are structured in a principally similar manner but may differ in specific design depending on the position of the bending lines etc. as described previously. In the following, focus is set on the first bolt 12, i.e. the first mounting sub-arrangement. It is assumed that the side members 2, 3 do not bend at the second bolt 13.

Figure 5:
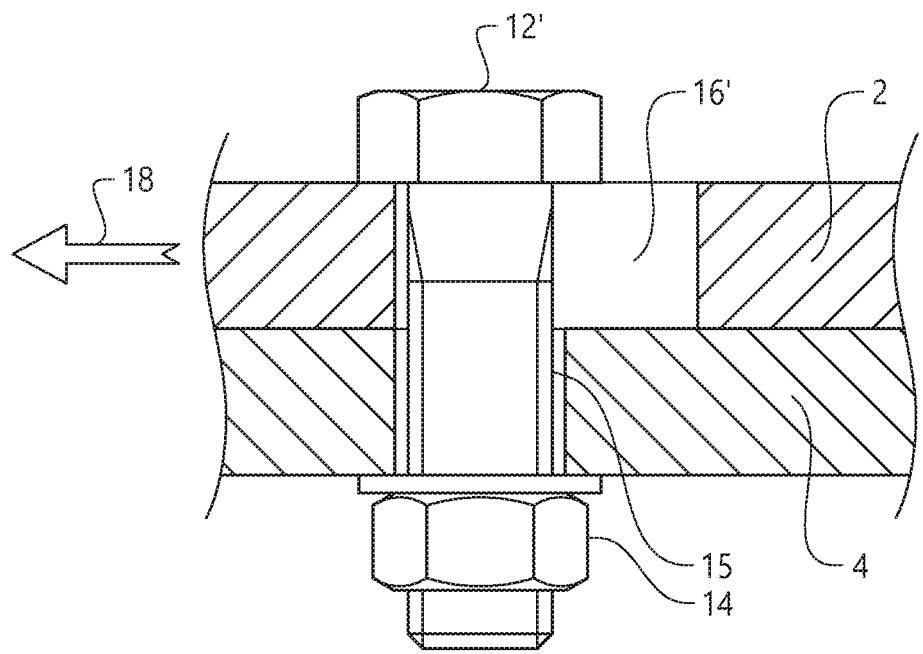
FIG. 5 shows, in a schematic cross sectional view, a first example of a mounting arrangement for connecting the cross member to the side member.
Figure 6:
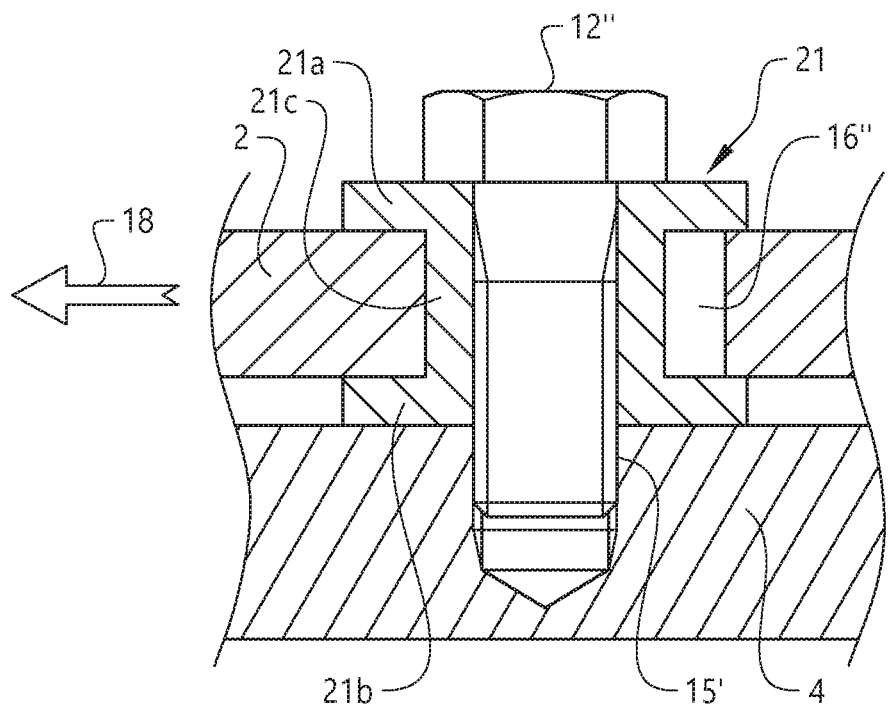
FIG. 6 shows, in a schematic cross sectional view, a second example of a mounting arrangement for connecting the cross member to the side member.

The first bolt 12, 12', 12" extends through a first hole 15, 15' in the first cross member 4 and a second hole 16, 16', 16" in the corresponding side member (see FIGS. 5-6). In the examples shown here, the first hole 15, 15' has a diameter corresponding to that of the first bolt 12, 12', 12", see FIGS. 5-6 and further explanations below. The first bolt 12, 12', 12" is fixed in relation to the first cross member 4.

In contrast, the second hole 16, 16', 16" is in this example elongated in the transversal direction and is substantially larger/wider than a diameter of the first bolt 12, 12', 12" so as to allow at least an initial bending deformation of the side member 2 without pressing the first bolt 12, 12', 12" onto an edge of the larger/wider second hole 16, 16', 16".

Figure 2:
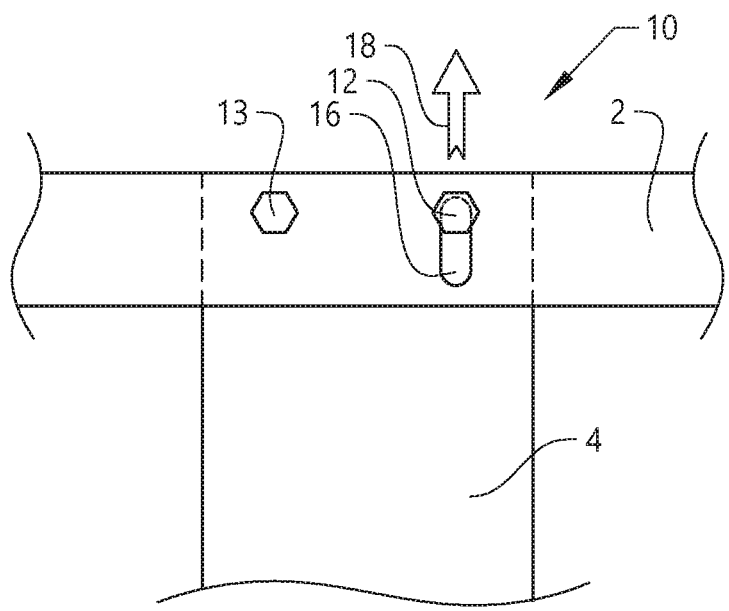
FIGS. 2-4 show, in a schematic view, a magnified view of one of the cross member—side member connections of FIG. 1 and a sequence indicating how the side member bends in the event of a frontal collision.

FIGS. 2-4 show a magnified view of the connection between the first cross member 4 and the first side member 2 of FIG. 1 in a sequence schematically indicating how the side member 2 bends and how the mounting arrangement 10 principally works in the event of a frontal collision. The elongated second hole 16 is indicated in FIGS. 2-4.

The second mounting sub-arrangement including the second bolt 13 is not paid any attention to here. In a real case some deformation involving the second bolt 13 would take place of course, but this has no particular influence on the principal behaviour of the structure at the first bolt 12.

As shown in FIG. 2, the first bolt 12 is arranged at a bending line, indicated by arrow 18, where the side member 2 is configured to bend outwards, away from a longitudinal centreline of the vehicle 1, when compressed in the event of a frontal collision. The bolt 12 is located in its normal position in the hole 16, i.e. at the outer edge of the transversally elongated hole 16.

In FIG. 3, the side member 2 has initiated its bending deformation in the outwards direction, i.e. the side member 2 has moved outwardly sideways in relation to the first cross member 4 and thus to the bolt 12 that is fixed to the first cross member 4. The friction of the mounting arrangement has been overcome and the bolt is now located at the inner edge of the transversally elongated hole 16. At this point, the parts involved in the bending deformation have achieved a considerable velocity and momentum.

FIG. 4 shows the next phase of the deformation process where the forces have become sufficient to break parts of the frame structure and decouple the side member 2 from the first cross member 4. This is indicated by the fracture 20 in the first cross member 4. The side member 2 is now free to continue its deformation at the bend line 18. This is only a schematic example and it is of course possible to design the system so that other parts breaks or collapses when subject to the developed forces.

FIGS. 5 and 6 show in schematic cross sectional side views a first and second example of a mounting arrangement for connecting the first cross member 4 to the side member 2. Both examples are in line with what is shown in FIGS. 2-4, i.e. the bolt 12', 12" is fixed to the first cross member 4, the larger/wider hole is arranged in the side member 2, the side member 2 is intended to bend as indicated by arrow 18 outwards (away from the other side member 3 located somewhere to the right in relation to FIGS. 5 and 6).

As shown in FIG. 5, a bolt 12' with screw head is inserted through holes 16' and 15 and is secured at underside of the first cross member 4 by means of a nut 14. As can be seen in FIG. 5, a space is provided at the side, the right side in FIG. 5, of the bolt 12' allowing the side member 2 to be moved in relation to the cross member 4, towards the left in FIG. 5, without pressing the bolt 12' onto any edge of the hole 16' in the side member 2. Only a friction threshold in the mounting arrangement must be exceeded for this relative motion.

The example shown in FIG. 6 is principally similar to the example shown in FIG. 5. One difference is that the bolt 12" is fixed by threading into the first cross member 4. A further difference is that the mounting arrangement includes a bushing arrangement 21 made of a resilient material.

The bushing arrangement 21 forms in this case a single annular integral unit arranged circumferentially around the bolt 12". The bushing arrangement 21 includes a first part 21*a* arranged between the screw head and, in this case, the upper side of the side member 2, and a second part 21*b* arranged between, in this case, the lower side of the side member 2 and the upper side of the first cross member 4. The side member 2, more specifically a part of the side member 2 close to the left edge of the hole 16", is clamped between the first and second parts 21*a*, 21*b* of the bushing arrangement 21.

The bushing arrangement further includes a third annular part 21*c* extending between and connecting the first and second annular parts 21*a*, 21*b*. The first and second annular parts 21*a*, 21*b* protrude outwardly in a radial direction of the bolt 12" so as to form a recess along and around the third annular part 21*c*. A side of the edge of the hole 16" in the side member 2 is adapted to fit into the recess along and partly around the third annular part 21*c* of the bushing arrangement 21.

The bushing arrangement 21 eliminates or reduces the transfer of vibrations from the first cross member 4 to the side member 2. The electric motor 6 and any transmission coupled to the motor can generate vibrations that, if transferred to the first cross member 4 and further to the side members 2 and the rest of the frame structure, may produce disturbing noise in the passenger compartment.

The bushing arrangement 21 is also useful for producing a reasonable level of friction in the mounting arrangement; not too high friction so that the first cross member 4 locks the side member 2 and prevents its initial transversal bending movement, and not too low friction so that the side member 2 may move in relation to the first cross member 4 during normal operation of the vehicle. As can be understood from FIG. 6 and the information above, the side member 2 is placed in the bushing recess between the first and second annular parts 21a, 21b of the bushing arrangement 21 during the initial bending deformation. With reference to FIG. 6, the side member is moved/slid to the left so that the space in the hole 16" becomes positioned on the left side of the bolt 12". There is no direct contact between the (metallic) side member 2 and (metallic) first cross member 4 at the mounting arrangement during this movement.

The hole 16" in FIG. 6 is somewhat larger In the longitudinal direction than the hole 16' in FIG. 5 in order to fit around both the fastening element 12" and the third part 21c of the bushing 21. The hole 16" in FIG. 6 may be wider than the hole 16' in FIG. 5 to allow more room for the fastening element 12" and the (third part 21c) of the bushing 21.

The example shown in FIG. 5 may exhibit a too high friction if all parts are made of metal and the nut 14 is tightly tightened. Further, this principal example lacks any vibration insulation.

The mounting arrangement shown in FIG. 6 may be provided with a washer below the screw head and/or with an inner annular insert (radially inside of the bushing 21) that provides some play around the bolt 12" in order to provide some tolerances for fitting the bolt 12" into the hole 15' during manufacture. Such an insert may be provided with a flange at the upper end that can rest onto the first annular part 21a of the bushing arrangement 21 so as to hold the insert in place. Such a flange may also function as a washer.

As an alternative to what is shown in FIGS. 5 and 6 the bolt 12', 12" may be placed closer to a centre position in the opening 16', 16", i.e. there may be a free space on both sides of the bolt to allow for bending deformation in both directions.

A further alternative is that the hole 16', 16" is open all the way to an end portion of the component it is provided on so that only friction in the mounting arrangement needs to be overcome to completely decouple the side member 2 from the first cross member 4.

The invention is not limited by the embodiments described above but can be modified in various ways within the scope of the claims.

What is claimed is:

1. A vehicle, comprising:
   an electric motor operatively connected to at least one driving wheel of the vehicle, and
   a frame structure comprising first and second side members extending in a longitudinal direction along opposite sides of the vehicle and at least one cross member extending in a transversal direction of the vehicle and being connected to the first and second side members,
   wherein the electric motor is supported by the frame structure in association with a pair of front wheels of the vehicle,
   wherein each of the side members, at least along a deformable section thereof, is configured to deform by bending in an inwards and/or outwards transversal direction when compressed by a longitudinally directed force exceeding a threshold value when the vehicle is subject to a sufficiently energetic frontal collision,
   wherein a first cross member extends between the first and second side members at the deformable section thereof,
   wherein the electric motor is supported by the first cross member,
   wherein the first cross member is mounted to at least one of the side members via a mounting arrangement comprising an elongated fastening element extending in a direction that exhibits a substantial 90° angle in relation to the transversal direction of the vehicle,
   wherein the fastening element extends through a first hole in the cross member and a second hole in the corresponding side member, and
   wherein at least one of the first and second holes, at least in the transversal direction, is substantially larger/wider than a diameter of the fastening element so as to allow at least an initial bending deformation of the side member without pressing the fastening element onto an edge of the larger/wider hole.

2. The vehicle according to claim 1, wherein a resilient material is arranged between the first cross member and the first and second side members so as to eliminate or reduce transfer of vibrations.

3. The vehicle according to claim 1, wherein the elongated fastening element is provided with a screw head.

4. The vehicle according to claim 3, wherein the mounting arrangement is provided with a bushing arrangement comprising first and second annular parts arranged circumferentially around the fastening element, wherein the first annular part is arranged between the screw head and any of the side member or the first cross member, and wherein the second annular part is arranged between the side member and the first cross member.

5. The vehicle according to claim 4, wherein the bushing arrangement comprises a third annular part extending between and connecting the first and second annular parts, preferably the first, second and third annular parts form one integral unit.

6. The vehicle according to claim 5, wherein the first and second annular parts of the bushing arrangement protrudes outwardly in a radial direction of the fastening element so as to form a recess along and around the third annular part.

7. The vehicle according to claim 6, wherein a side of an edge of the first or the second hole is adapted to fit into the recess along and partly around the third annular part of the bushing arrangement.

8. The vehicle according to claim 1, wherein the elongated fastening element extends through the hole in the side member and is fixed into the hole of the first cross member.

9. The vehicle according to claim 8, wherein the hole in the side member is substantially larger/wider in the transversal direction than the diameter of the fastening element.

10. The vehicle according to claim 9, wherein the hole in the side member is larger/wider at an inside of the fastening element.

11. The vehicle according to claim 1, wherein the larger/wider hole provides a space transversally inside and/or outside of the elongated fastening element, wherein said space is adapted to receive a part of the mounting arrangement when the side member is moved in relation to the cross member in the transversal direction.

12. The vehicle according to claim 1, wherein the vehicle comprises a transmission unit operatively connected to the electric motor, wherein also the transmission unit is supported by the first cross member.

13. The vehicle according to claim 1, wherein the electric motor is operatively connected to at least one of the front wheels.

14. The vehicle according to claim 1, wherein the vehicle is a passenger car comprising a passenger compartment, wherein the first cross member is located in front of the passenger compartment.

15. A vehicle, comprising:
   a motor operatively connected to at least one driving wheel of the vehicle, and
   a frame structure comprising first and second side members extending in a longitudinal direction along opposite sides of the vehicle and at least one cross member extending in a transversal direction of the vehicle and being connected to the first and second side members,
   wherein the motor is supported by the frame structure in association with a pair of front wheels of the vehicle,
   wherein each of the side members, at least along a deformable section thereof, is configured to deform by bending in an inwards and/or outwards transversal direction when compressed by a longitudinally directed force exceeding a threshold value when the vehicle is subject to a sufficiently energetic frontal collision,
   wherein a first cross member extends between the first and second side members at the deformable section thereof,
   wherein the motor is supported by the first cross member,
   wherein the first cross member is mounted to at least one of the side members via a mounting arrangement comprising an elongated fastening element extending in a direction that exhibits a substantial 90° angle in relation to the transversal direction of the vehicle,
   wherein the fastening element extends through a first hole in the cross member and a second hole in the corresponding side member, and
   wherein at least one of the first and second holes, at least in the transversal direction, is substantially larger/wider than a diameter of the fastening element so as to allow at least an initial bending deformation of the side member without pressing the fastening element onto an edge of the larger/wider hole.

* * * * *